US008868822B2

(12) United States Patent
Komori (10) Patent No.: US 8,868,822 B2
(45) Date of Patent: Oct. 21, 2014

(54) DATA-PROCESSING METHOD, PROGRAM, AND SYSTEM (75) Inventor: Hiroyuki Komori, Yokohama (JP)

(73) Assignee: Spansion LLC, Sunnyvale, CA (US)

( * ) Notice: Subject to any disclaimer, the term of this patent is extended or adjusted under 35 U.S.C. 154(b) by 516 days.

(21) Appl. No.: 13/039,839

(22) Filed: Mar. 3, 2011

(65) Prior Publication Data

US 2011/0238896 A1 Sep. 29, 2011

(30) Foreign Application Priority Data

Mar. 24, 2010 (JP) .................................. 2010-68110

(51) Int. Cl.
*G06F 12/00* (2006.01)
*G06F 12/02* (2006.01)

(52) U.S. Cl.
CPC ................................ *G06F 12/0246* (2013.01)
USPC ............ 711/103; 711/100; 711/102; 711/113; 711/137; 711/163; 711/200; 711/202; 711/205; 711/206; 711/207; 711/220; 711/221

(58) Field of Classification Search
CPC ..... G06F 21/78; G06F 21/64; G06F 12/0246; G06F 21/79; G06F 12/0284; G06F 2212/2022; G06F 3/0679; G06F 11/1068; G06F 11/1435; G06F 11/2056; G06F 11/2087; G06F 11/3466; G06F 12/023; G06F 12/1009
USPC ................. 711/103, 113, 137, 163, 200, 202, 711/205–207, 220–221, E12.008, E12.015, 711/E12.057
See application file for complete search history.

(56) References Cited

U.S. PATENT DOCUMENTS

| 5,557,767 A | * | 9/1996 | Sukegawa ...................... 711/113 |
| 6,151,247 A | * | 11/2000 | Estakhri et al. ........... 365/185.11 |
| 6,865,658 B2 | * | 3/2005 | Tomori et al. .................. 711/173 |
| 7,752,381 B2 | * | 7/2010 | Wong ............................. 711/103 |
| 8,214,605 B2 | * | 7/2012 | Boettcher et al. .............. 711/154 |
| 2009/0310412 A1 | | 12/2009 | Jang et al. |

FOREIGN PATENT DOCUMENTS

| JP | 11-328982 A | 11/1999 |
| JP | 2000-222292 A | 8/2000 |
| JP | 2004-310268 A | 11/2004 |
| JP | 2008-97526 A | 4/2008 |

OTHER PUBLICATIONS

Office Action mailed Nov. 12, 2013 in Japanese application No. 2010-068110.

* cited by examiner

*Primary Examiner* — Yong Choe
*Assistant Examiner* — Zhuo Li
(74) *Attorney, Agent, or Firm* — Sterne, Kessler, Goldstein & Fox P.L.L.C.

(57) ABSTRACT

A data-processing method in a flash memory with a plurality of sectors, the method includes arranging first data which is not updated in a first sector at a leading portion of a second sector and adding a first identifier of the first data to the second sector by a memory control circuit when transferring data in the first sector to the second sector, the plurality of sectors including the first sector and the second sector.

15 Claims, 10 Drawing Sheets

DATA-PROCESSING METHOD, PROGRAM, AND SYSTEM

CROSS-REFERENCE TO RELATED APPLICATIONS

This application claims the benefit of priority from Japanese Patent Application No. 2010-68110 filed on Mar. 24, 2010, the entire contents of which are incorporated herein by reference.

BACKGROUND

1. Field

Embodiments discussed herein relate to a data-processing method, a program, and a system.

2. Description of Related Art

A non-volatile memory, such as a flash memory, does not overwrite new data on a storage area where data has been already written. The new data is written on the storage area in an erase state.

Related art is disclosed in Japanese Laid-open Patent Publication No. 2004-310268, Japanese Laid-open Patent Publication No. 2008-97526 or the like.

SUMMARY

According to one aspect of the embodiments, a data-processing method in a flash memory with a plurality of sectors includes arranging first data which is not updated in a first sector at a leading portion of a second sector and adding a first identifier of the first data to the second sector by a memory control circuit when transferring data in the first sector to the second sector, the plurality of sectors including the first sector and the second sector.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

When data to be updated is sequentially written while incrementing memory addresses, the data with high update frequency is transferred to a storage area with a large address. On the other hand, the data with low update frequency stays in a storage area with a small address. Since search of data to be read is performed in the order from the storage area with the large address to the storage area with the small address, a search efficiency of data with low update frequency may be kept low.

Figure 1:
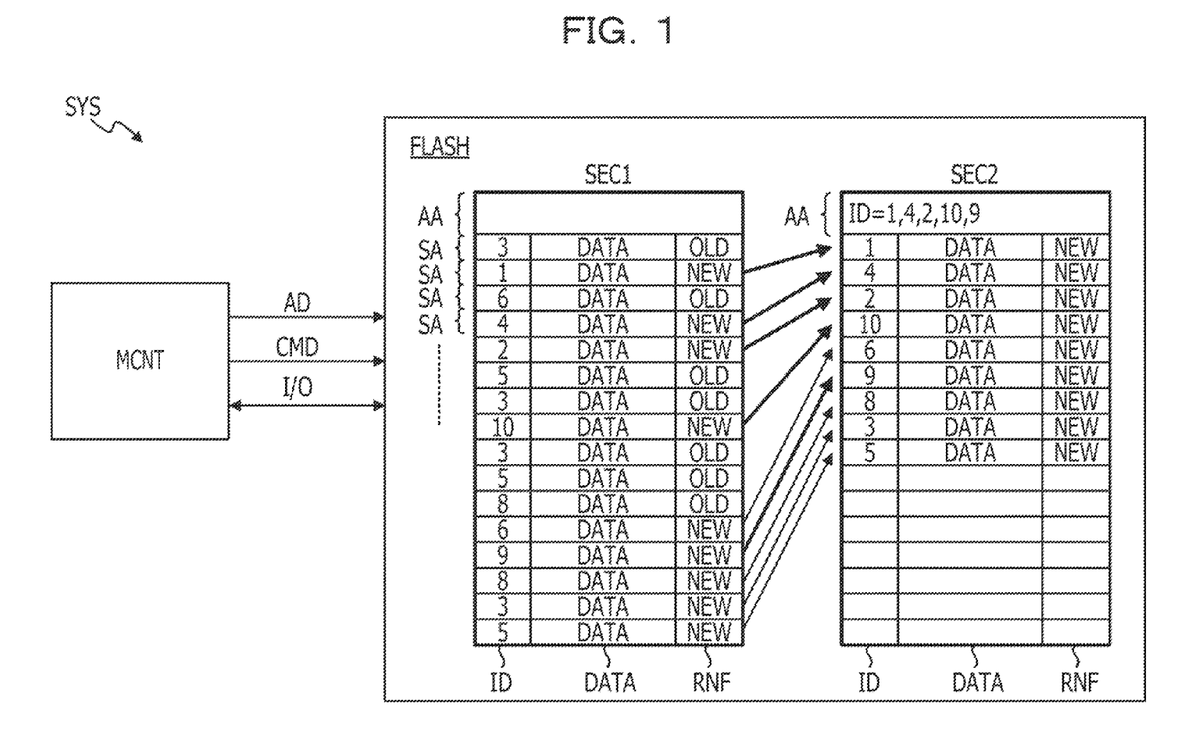
FIG. 1 illustrates an exemplary system.

FIG. 1 illustrates an exemplary system. For example, the system SYS, such as a user system, may be included in a microcomputer system of a mobile device, or the like.

For example, the system SYS includes a non-volatile semiconductor memory, such as a flash memory FLASH, and a flash memory control circuit MCNT that controls access to the flash memory FLASH. The flash memory control circuit MCNT supplies an address signal AD and a command signal CMD to the flash memory FLASH to access the flash memory FLASH. The flash memory FLASH performs a write operation, a read operation, or an erasing operation in response to the address signal AD and the command signal CMD. The flash memory control circuit MCNT supplies write data to a data terminal I/O of the flash memory FLASH in the write operation. The flash memory control circuit MCNT receives read data from the data terminal I/O of the flash memory FLASH.

For example, the flash memory control circuit MCNT includes a computer, such as a central processing unit (CPU). The computer executes a program, while the flash memory FLASH performs the write operation, the read operation, and the erasing operation. The flash memory control circuit MCNT may include a memory controller that controls the flash memory FLASH based on instructions from the controller of the CPU or the like. The flash memory control circuit MCNT is instructed by a program executed by the CPU to control the flash memory FLASH. The program may store a storage medium which is readable by the CPU.

The flash memory FLASH includes at least two sectors SECs (SEC1 and SEC2). Each of the sectors SEC1 and SE2 includes a plurality of storage areas SAs where data received at the data terminal I/O is written. Each storage area SA includes data DATA, an identifier ID indicating a type of the data DATA, and an updating flag RNF indicating whether the data DATA is updated or not. Each sector SEC includes an addition area AA that stores the identifier ID of the data DATA which was not updated in the sector SEC that was valid previously. For example, the identifier ID may be expressed by a decimal numeral.

The data is written in the storage area SA or the addition area AA. The data of the flash memory FLASH is erased in units of sector SEC. The data DATA and the identifier ID may not be overwritten in the storage area SA.

The flash memory control circuit MCNT stores the data DATA together with identifiers IDs in the sector SEC. Old data DATA (OLD) is successively updated to new data DATA (NEW). If the sector SEC1 is full, the data DATA is transferred to the next sector SEC2. For each identifier ID, the newest data DATA and the identifier ID in the sector SEC1 are transferred to the section SEC2. The number of valid sectors SECs where the data DATA is read or written may be one.

After transferring the data DATA and the identifier ID to the sector SEC2, the sector SEC1 enters a state where the erase operation is performed in response to an erasing instructions from the flash memory control circuit MCNT and is invalidated. The sector SEC2 is validated with the invalidation of the sector SEC1. Before the sector SEC2 becomes full with the data DATA and the transfer of data DATA occurs, the sector SEC1 may be erased.

The flash memory control circuit MCNT stores the new data DATA with the respective identifiers IDs successively into the sector SEC2. When the sector SEC2 is full, the newest data DATA is transferred to the sector SEC 1 for each of the respective identifier ID. The sectors SEC1 and SEC2 are used by turns to retain the data DATA. For example, when in the case of the flash memory FLASH includes three or more sectors SECs, the data DATA is stored using three or more sectors SECs in rotation.

The areas of the sectors SEC1 and SEC2 are erased in an initial state, respectively. In each of the sectors SEC1 and SEC2, for example, the data DATA is successively written in empty areas from a leading address. In the sector SEC2 illustrated in FIG. 1, a blank storage area SA represents the empty area. For example, the leading address may be assigned to the top storage area SA illustrated in FIG. 1. For example, the address values of the upper storage areas SAs illustrated in FIG. 1 may be small, while the address values of the lower storage areas SAs may be large.

The flash memory control circuit MCNT writes newly the data DATA and the respective identifier ID in the empty area and stores a renewal flag RNF indicating that the data DATA is new data "NEW". If the renewal flag RNF in the erase state indicates "NEW", the renewal flag RNF may not be rewritten. The flash memory control circuit MCNT rewrites the renewal flag RNF corresponding to the previously existing data DATA from "NEW" to "OLD" (old data). If there is a plurality of pieces of data DATA corresponding to a single identifier ID in the sector SEC, whether the data is new or old may be identified by the renewal flag RNF.

For example, logic "1" may represent new data "NEW" and logic "0" may represent old data "OLD". For example, in the flash memory FLASH, logic "1" may represent an erase state and logic "0" may represent a write state. A renewal flag RNF may be changed from "NEW" to "OLD". The renewal flags RNFs of each of the storage areas SAs are rewritten from "NEW" to "OLD" and the data DATA is updated for each identifier ID.

An arrow in the flash memory FLASH illustrated in FIG. 1 represents a state where data DATA is written on all the storage areas SAs in the sector SEC1 and new data DATA is then transferred to the next sector SEC2. For example, if the valid sector SEC1 is full, the flash memory control circuit MCNT copies data DATA whose the renewal flag RNA is "NEW" to the sector SEC2 as the newest data DATA. The flash memory control circuit MCNT searches data DATA indicating "NEW" in the sector SEC1 from the first address and, as illustrated by the arrows in FIG. 1, the data is written together with the respective identifier ID in the sector SEC2 from the head.

A thick arrow indicates that data DATA, which has not been updated in the sector SEC1, is transferred to the sector SEC2. A thin arrow indicates that data DATA, which has been updated at least once in the sector SEC1, is transferred to the sector SEC2. For example, as indicated by the arrows, the data DATA corresponding to "NEW" are transferred to the next sector SEC2 in the order of smaller to larger address. The data DTA with lower update frequency may be transferred to the next sector SEC2 in the order of smaller to larger address. The data DATA with the identifier ID=9 may be copied to the sector SEC2 ahead of the data DATA with the identifier ID=6.

The flash memory control circuit MCNT writes the identifier ID number (the identifier ID represented by the thick arrow) of the data DATA, which has not been updated, in an additional area of the sector SEC2. The data DATA which has not been updated may be identified by confirming that the sector SEC1 has only one the same identifier ID. The flash memory control circuit MCNT invalidates the sector SEC1 and validates the sector SEC2. The information stored in the invalid sector SEC1 may be erased before the next data DATA is transferred from the sector SEC2.

Figure 2:
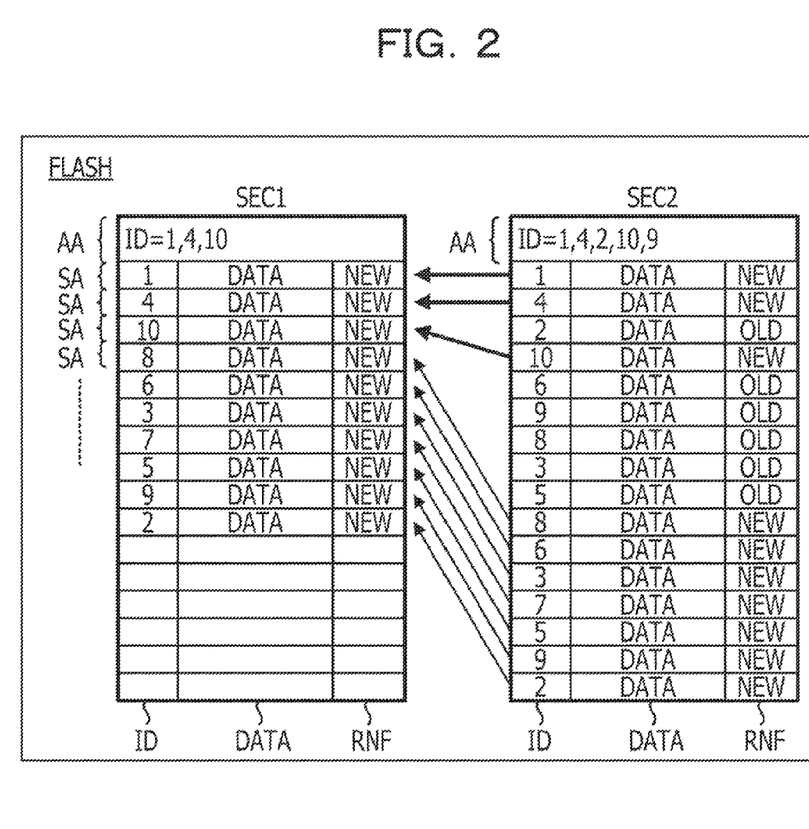
FIG. 2 illustrates an exemplary data transfer.

FIG. 2 illustrates data transfer. In the system SYS illustrated in FIG. 1, data DTA is transferred from the sector SEC2 to the sector SEC1. After validating the sector SEC2, the data DATA with the respective identifiers IDs "8, 6, 3, 7, 5, 9, and 2" is written in the sector SEC2, respectively. With respect to other data DATA except of the data DATA with the identifier ID "7", old data DATA is already stored in the sector SEC2 as a result of transfer from the sector SEC1. The renewal flag RNF of the old data DATA is set from "NEW" to "OLD". Data DATA which is not updated remains in the storage area SA with a smaller address, while data DATA which is updated is transferred to the storage area SA with a larger address.

The flash memory control circuit MCNT determines the update frequency of data with reference to the additional area AA during the period when the sector SEC2 is valid. For example, when reading data DATA from the sector SEC2, the flash memory control circuit MCNT detects whether the identifier ID of the data DATA to be read exists in the additional area AA. If the identifier ID of the data DATA to be read exists in the additional area AA, the flash memory control circuit MCNT searches the identifier ID indicating "NEW" from the head of the sector 2 and reads the data DATA.

If there is no identifier ID of the DATA to be read on the additional area AA, the flash memory control circuit MCNT searches the identifier ID assigned with "NEW" from the end of the sector SEC2 and reads the data DATA. The data DATA corresponding to the identifier ID which does not exist in the additional area AA is updated and is stored in the storage area SA with a comparatively large address. Therefore, the identifier ID of the data DATA to be read may be found earlier by searching such data DATA from the storage areas SAs with larger addresses.

The order (direction) of search when reading data DATA is changed depending on the update frequency of the data DATA. Thus, a search time may be reduced and the efficiency of reading data may be improved. For example, the order of reading data DATA, which has lower update frequency and is stored on the address areas on the head side of the sector SEC2, is exchanged with the order of reading data DATA, which has higher update frequency and is stored in the address areas on the end side of the sector SEC2. Therefore, the search time when reading the data DATA may be reduced and the efficiency of reading the data DATA may be improved.

For example, data DATA with low update frequency includes basic information, such as a profile. The basic information includes specific information, such as a residence address, a mail address, or a contract plan of service. The data DATA with low update frequency is updated irregularly and includes a unit price of an electricity rate or the like and a date of maintenance. The data DATA with high update frequency includes the usage of service, the amount of electric power used, and records acquired in real time.

If the sector SEC2 is full, as illustrated in FIG. 2, the data DATA indicating "NEW" is transferred to the sector SEC1. The data DATA, which has the identifier ID in the additional area AA and does not have "OLD", is determined as not being updated in the sector SEC2. For example, in the second or later transfer of data DATA, the not-updated data may be searched quickly by referring the additional area AA.

In the transfer, the identifier IDs=1, 4, and 10 of the not-updated data DATA are written in the addition area AA of the sector SEC1, respectively. The data DATA with the identifier IDs=1, 4, and 10 are written in the sector SEC1 from the head of the sector SEC1. The remaining data DATA representing "NEW" and the respective identifiers ID are written in the sector SEC1. The transfer of data DATA from the sector SEC2 to the sector SEC1 is completed, the sector SEC2 is invalidated, and the sector SEC1 is validated. The information stored in the sector SEC2 may be erased before the next transfer is performed.

The data DATA with low update frequency is read from the leading address. Thus, the retrieval time of the data DATA may be shortened and the efficiency of reading data may be improved. Since the identifiers IDs of the unupdated data DATA are stored in the addition area AA, the data DATA with low update frequency is searched quickly. For example, the order of reading data DATA stored in the address areas on the head side of the sector SEC2 is exchanged with the order of reading data DATA with higher update frequency stored in the address areas on the end side of the sector SEC2. Therefore, the average of search times for reading data DATA may be shorten and the efficiency of reading data DATA may be improved.

Figure 3:
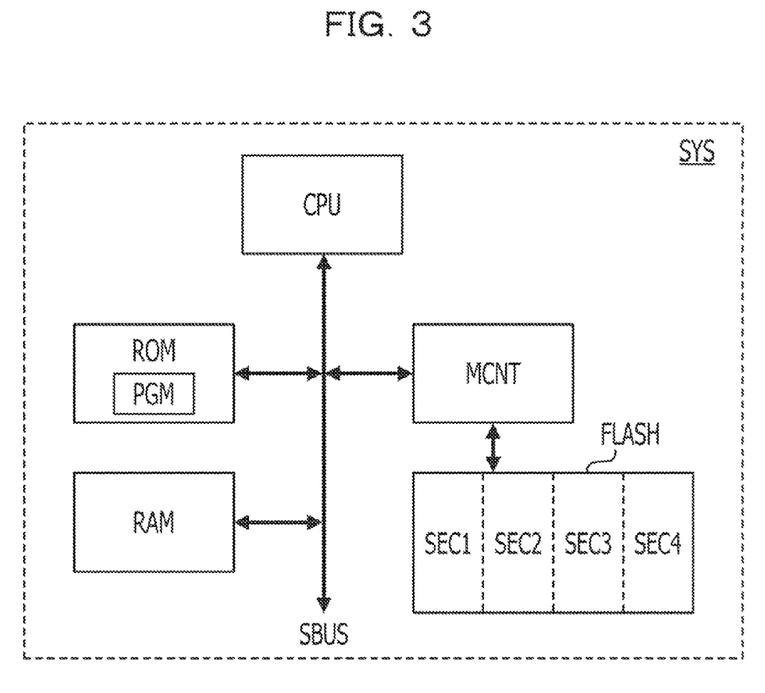
FIG. 3 illustrates an exemplary system.

FIG. 3 illustrates an exemplary system. In FIG. 3, elements which are substantially the same as or similar to those illustrated in FIGS. 1 to 2 may be provided with the same reference numerals and the description may be omitted or reduced. The system SYS, for example, a user system may include a microcomputer system such as a mobile device. The system SYS may include a plurality of macros accumulated on a silicon substrate or may include a plurality of chips mounted on a package substrate.

For example, the system SYS may include a central processing unit CPU (controller), a read only memory ROM, a random access memory RAM, a flash memory control circuit MCNT, and a flush memory FLASH. The CPU, the ROM, the RAM, and the flush memory control circuit MCNT are coupled to one another through a system bus SBUS. The flash memory control circuit MCNT and the flush memory FLASH are coupled to each other through a dedicated bus. If the CPU has a function of the flush memory control circuit MCNT, the CPU may access the flash memory FLASH without the flash memory control circuit MCNT.

The CPU accesses the ROM or the RAM and also accesses the flash memory FLASH through the flash memory control circuit MCNT, thereby controlling the entire system. The flash memory FLASH performs the write operation, the read operation, and the erase operation in response to an access request from the flash memory control circuit MCNT which operates based on the instructions from the CPU. The flash memory FLASH may include, for example, four sectors SECs (SEC1 to SEC4).

For example, the ROM stores a program PGM which are executed by the CPU. The program PGM may be, for example, a program for performing at least part of data processes illustrated in FIG. 5A to FIG. 10. When the system SYS runs, the program PGM is transferred from the ROM to the RAM and the CPU may execute the program PGM in the RAM. At least part of data processes illustrated in FIGS. 5A to 5D to FIG. 10 may be executed by the flash memory control circuit MCNT. The flash memory FLASH may be coupled to the CPU without the connection of the flash memory control circuit MCNT. The system SYS may include the CPU and the flash memory FLASH. For example, the program to be executed by the CPU may be stored in the ROM area built in the CPU.

Figure 4:
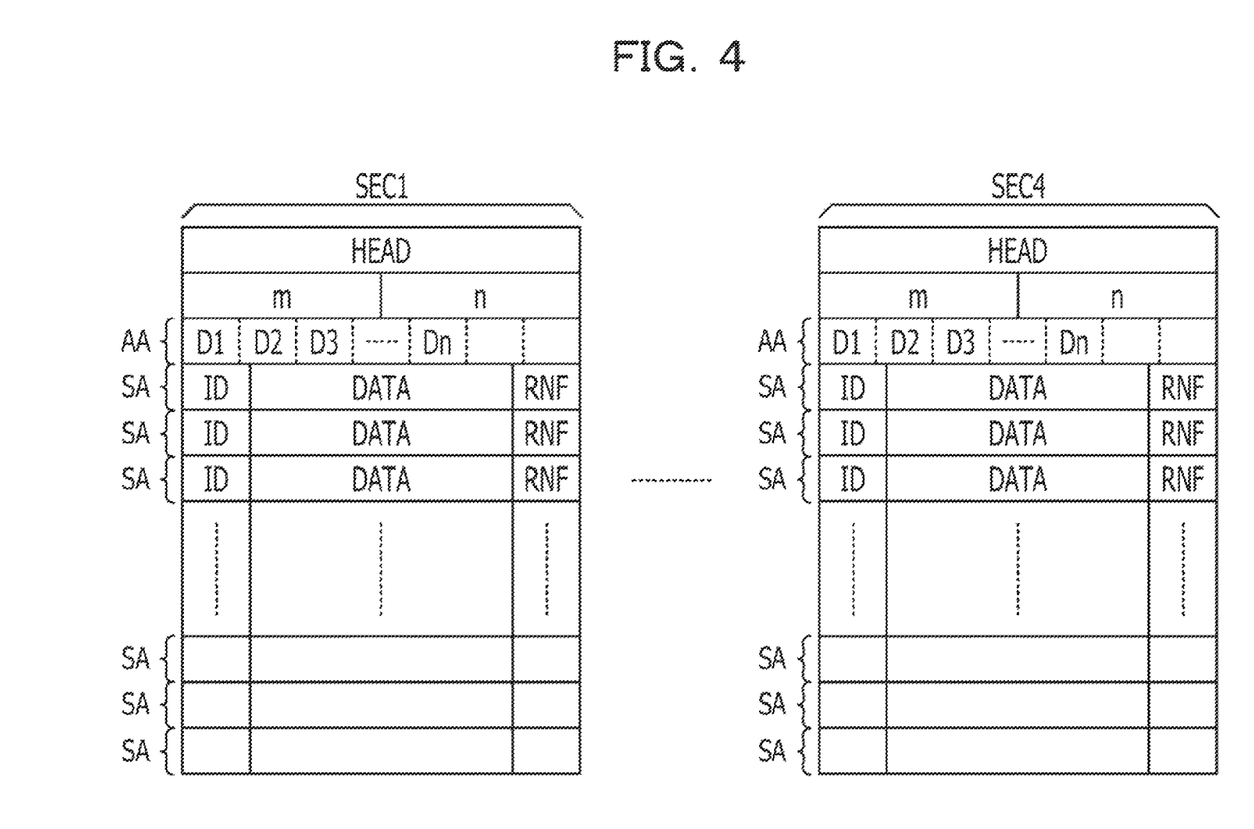
FIG. 4 illustrates an exemplary data.

FIG. 4 illustrates an exemplary data. The data illustrated in FIG. 4 may be stored in the flash memory FLASH illustrated in FIG. 3. The configurations of the sectors SEC1 to SEC4 illustrated in FIG. 3 are substantially the same or similar to each other. Therefore, the sector SEC1 will be described on behalf on these sectors.

The sector SEC1 includes a header HEAD, an area for storing the number m of data DATA which is transferred in the transfer process, and the number of unupdated data DATA (unupdate number n) in addition to the storage areas SAs and the addition area AA, which are illustrated in FIG. 1. The addition area AA stores unupdated information Di ("i" indicates the identifier number) that represents the identifier ID of unupdated data DATA in the invalidated sector SEC. A certain number of the additional areas AAs may be generated. Alternatively, the number of the additional addition areas AAs to be generated may correspond to the unupdate number n. In the case of the latter, the leading address of the storage area SA is calculated from the unupdate number "n".

For example, the header HEAD stores a valid flag indicating whether the sector SEC is valid or invalid, an erasing-desired flag indicating that the data DATA is erased by the transfer, and an erasing-completed flag indicating the completion of the erase operation. For example, the valid flag may be two bits, the valid flag of "10" in binary may represent a valid state, the valid flag of "00" may represent an invalid state, and the valid flag of "11" represents an erase state. When the valid flag indicates a valid state, the sector SEC is used. For example, the erasing-desired flag may be one bit. The erasing-desired flag of "1" in binary represents that the erase operation is not required and the erasing-desired flag of "0" represents that the erase operation is desired. For example, the erasing-completed flag may be one bit. Thus, the erasing-completed flag of "1" in binary represents that the erase operation is completed and the erasing-completed flag of "0" represents that the erase operation is not completed.

FIGS. 5A to 5D illustrate an exemplary write operation. Data DATA may be written in the sector SEC1 illustrated in FIG. 4. In FIGS. 5A to 5D, an empty storage area SA represents an erase state. If other sector SEC, for example, a sector SEC4, is full, data DATA is transferred from the sector SEC4 to the sector SEC1, thereby validating the sector SEC1.

For example, when the data DATA is transferred from the sector SEC4 to the sector SEC1, the data DATA with the identifiers IDs=3, 1, 6, 4, 2, and 5 corresponds to data which is updated when the sector SEC4 is valid. Therefore, in FIG. 5A, the unupdate number "n", which represents the number of the unupdated data DATA, is set to "0" and the unupdated information Di is not written in the addition area AA. "F" of the additional area AA represents "1111" in binary and indicates an erase state where the unupdated information Di is not written. Each of the addition areas AA may be assigned with five bits or more. When the sector SEC1 is valid, six pieces of data DATA are stored. Thus, the transfer number "m" of data DATA in the transfer process is set to "6".

Figure 5A:
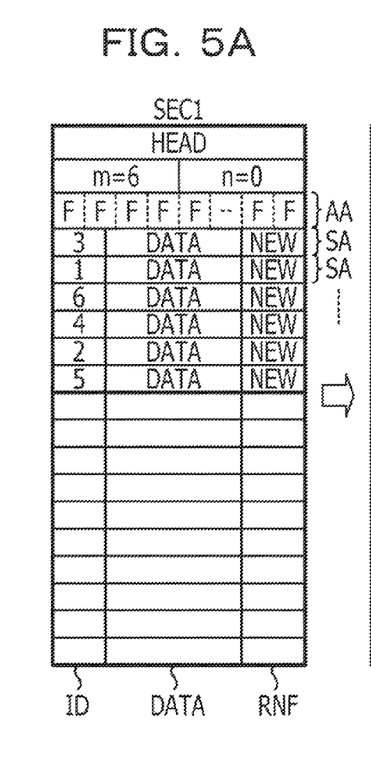
FIGS. 5A to 5D illustrate an exemplary data writing.
Figure 5B:
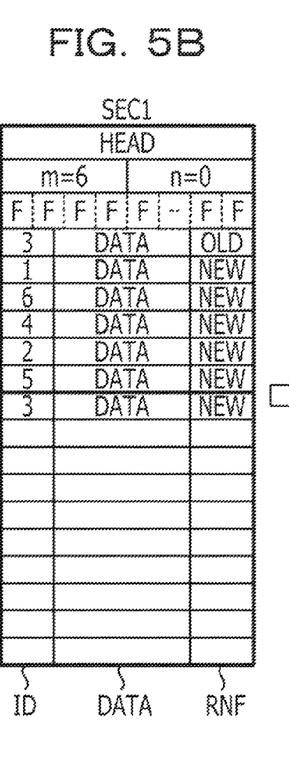

As illustrated in FIG. 5B, data DATA with the identifier ID=3 is written in the sector SEC1. New data DATA may be written together with its identifier ID in the storage area SA with the smallest address among the empty areas. For example, the new data DATA is stored after storing the data DATA which is transferred from the sector SEC4 to the sector SEC1.

When the new data DATA is written in the sector SEC1, it is detected whether the data DATA having the same identifier ID as that of the new data DATA is stored in the storage area SA. Since the data DATA with the identifier ID=3 is stored in the first storage area SA, the renewal flag RNF of the first storage area SA is changed from "NEW" to "OLD". The "NEW" of the renewal flag RNF may be represented by logic "1" (erase state). When the new data is written in an empty area, "NEW" may not be written in the renewal flag RNF.

Figure 5C:
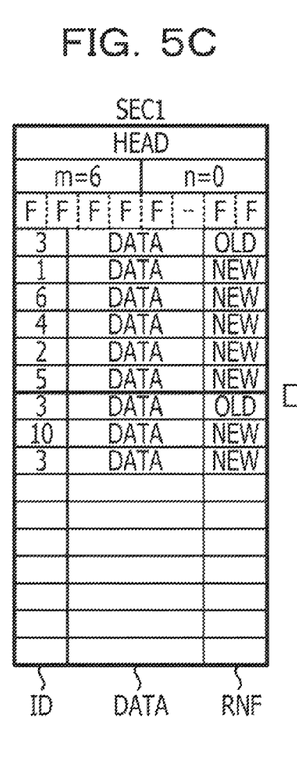
Figure 5D:
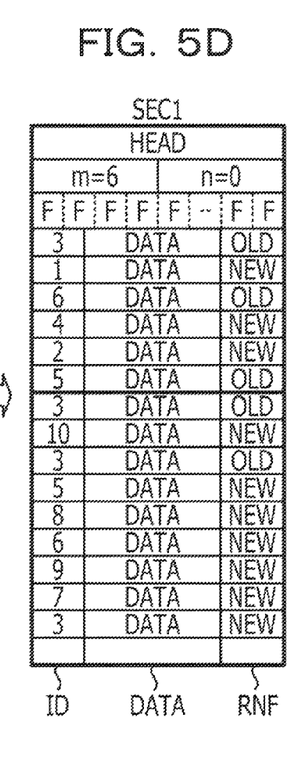

As illustrated in FIG. 5C, new data DATA with the identifier ID=10 or 3 is subsequently written in an empty storage area SA. Since the data DATA with the identifier ID=3 is already stored in the storage area SA, the renewal flag RNF corresponding to the data DATA with the identifier ID=3 is changed to "OLD". As illustrated in FIG. 5D, the new data DATA is written on larger addresses in order.

Figure 6:
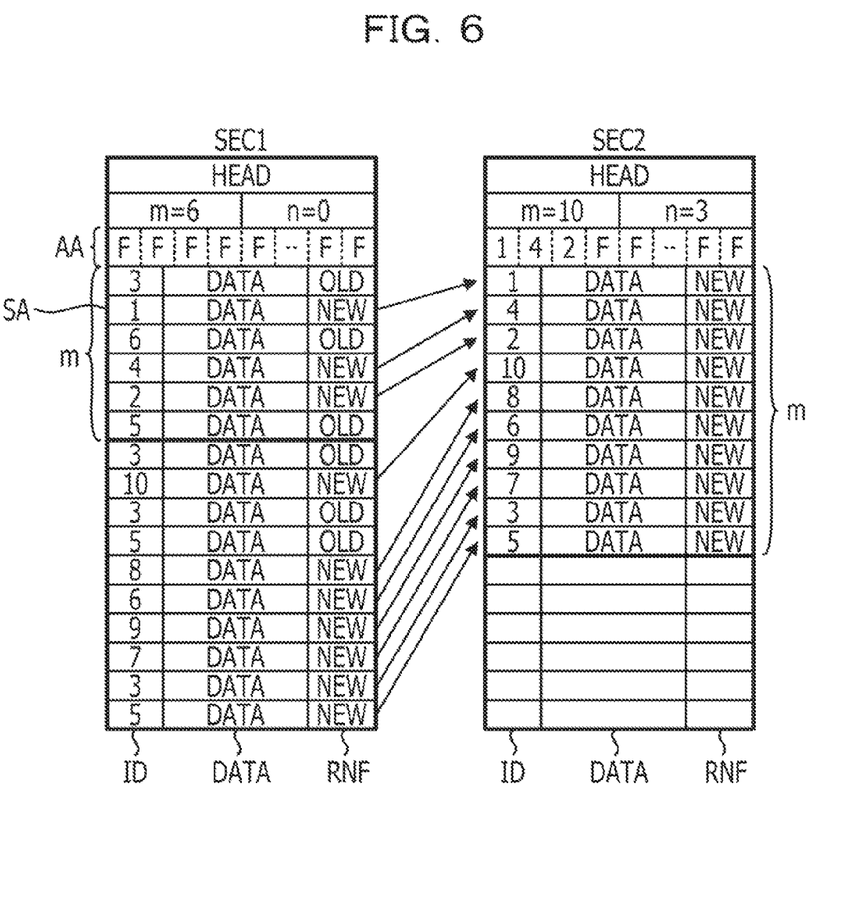
FIG. 6 illustrates an exemplary data transfer.

FIG. 6 illustrates an exemplary data transfer. In FIG. 6, after the sector SEC1 illustrated in FIG. 4 becomes full, data DATA is transferred to the next sector. For example, when data DATA is written in the state illustrated in FIG. 5D, the sector SEC1 may become full. Each of the sectors SEC 1 to 4 may include, for example, several hundreds of storage areas SA.

Renewal flags RNFs corresponding to the transfer number m to be stored in the sector SEC1 are read in order from the leading address. The identifiers ID whose renewal flag RNF is "NEW" among m renewal flags RNFs is written as unupdate information Di in the additional area AA of the next sector SEC2. The number of the identifiers IDs written in the additional area AA, such as 3, is written as a new unupdate number "n" in the next sector SEC2.

In the sector SEC1, the identifiers IDs and the data DATA of the storage area SA in which "NEW" is stored are written in the storage area SA of the next sector SEC2 in order. The number of pieces of data DATA written in the sector SEC, for example "10", is written as a new transfer number "m". The transfer of data DATA from the sector SEC1 to the sector SEC2 is completed.

Figure 7:
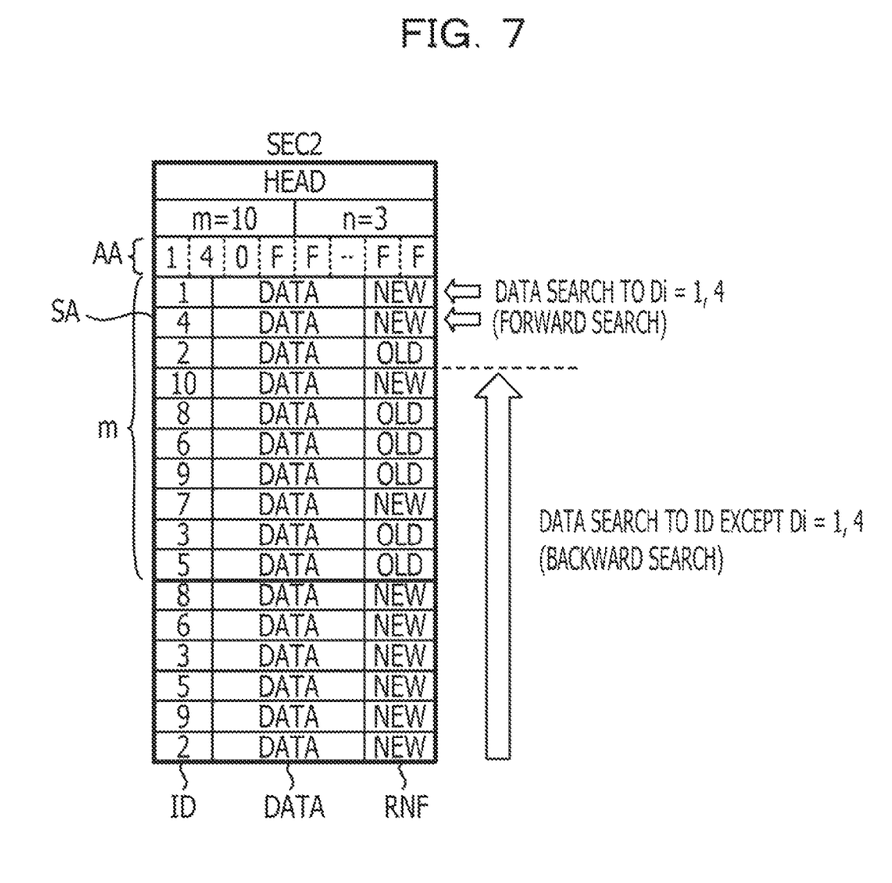
FIG. 7 illustrates an exemplary data search.

FIG. 7 illustrates an exemplary data search. In FIG. 7, data search is performed when data DATA is read from valid sector SEC2. For example, the third unupdate information Di of the additional area AA of the sector SEC2 (for example, the identifier ID=2) is cleared by "0" because new data DATA is written. Here, "0" indicates that the identifier ID is invalid. The invalid identifier ID is written to reduce an erroneous decision. In FIG. 7, although the sector SEC is full, data DATA may be read even if the data DATA are not stored in all the storage areas SAs.

The unupdate number n is read before the data DATA is read. When the identifier ID corresponding to the data DATA to be read corresponds to one of "n" pieces of unupdate information Di stored in the additional area AA, the i-th unupdate information Di is read. The data DATA corresponding to the identifier ID represented by the read unupdate information Di is read from the storage area SA on the smaller address side (forward search).

For example, the identifier ID=4 is stored as the second unupdate information Di of the additional area AA. Therefore, when the data DATA with the identifier ID=4 is read, the data DATA stored in the second top storage area SA is read. It is determined that the data DATA corresponding to the identifier ID which is not stored in the additional area AA has high update frequency and the data is searched from the storage area SA with a larger address (backward search).

Figure 8:
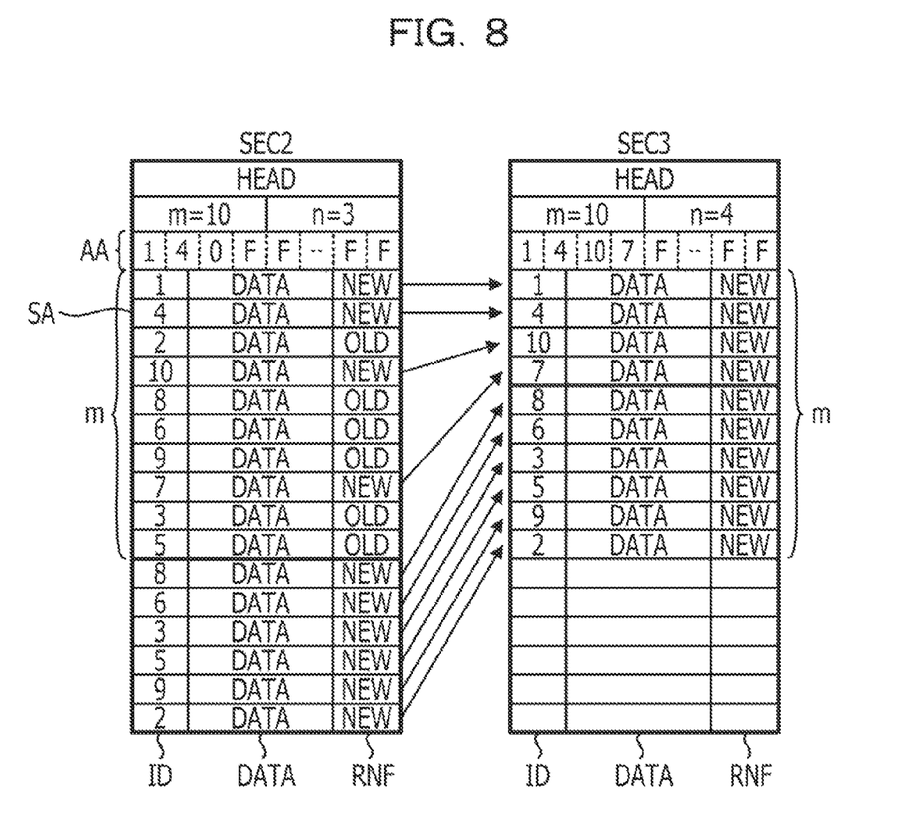
FIG. 8 illustrates an exemplary data transfer.

FIG. 8 illustrates an exemplary data transfer. For example, if the sector SEC2 illustrated in FIG. 6 is full, data DATA is transferred to the next sector SEC3. The state of the sector SEC2 may be substantially the same as that illustrated in FIG. 7. A basic operation illustrated in FIG. 8 may be substantially the same as or similar to that illustrated in FIG. 6.

Among renewal flags RNF, where the number of the renewal flags RNF corresponds to the transfer number m, the identifier ID corresponding to the renewal flag RNA having "NEW" is written as unupdate information Di in the additional area AA of the sector SEC3. New unupdate number n, for example 4, is written in the sector SEC3. The identifier ID and the data DATA corresponding to "NEW" in the sector SEC2 are sequentially written in the storage area SA of the sector SEC3 to be validated next. New transfer number m, for example 10, is written in the sector SEC3. The transfer of data DATA from the sector SEC2 to the sector SEC3 is completed.

Figure 9:
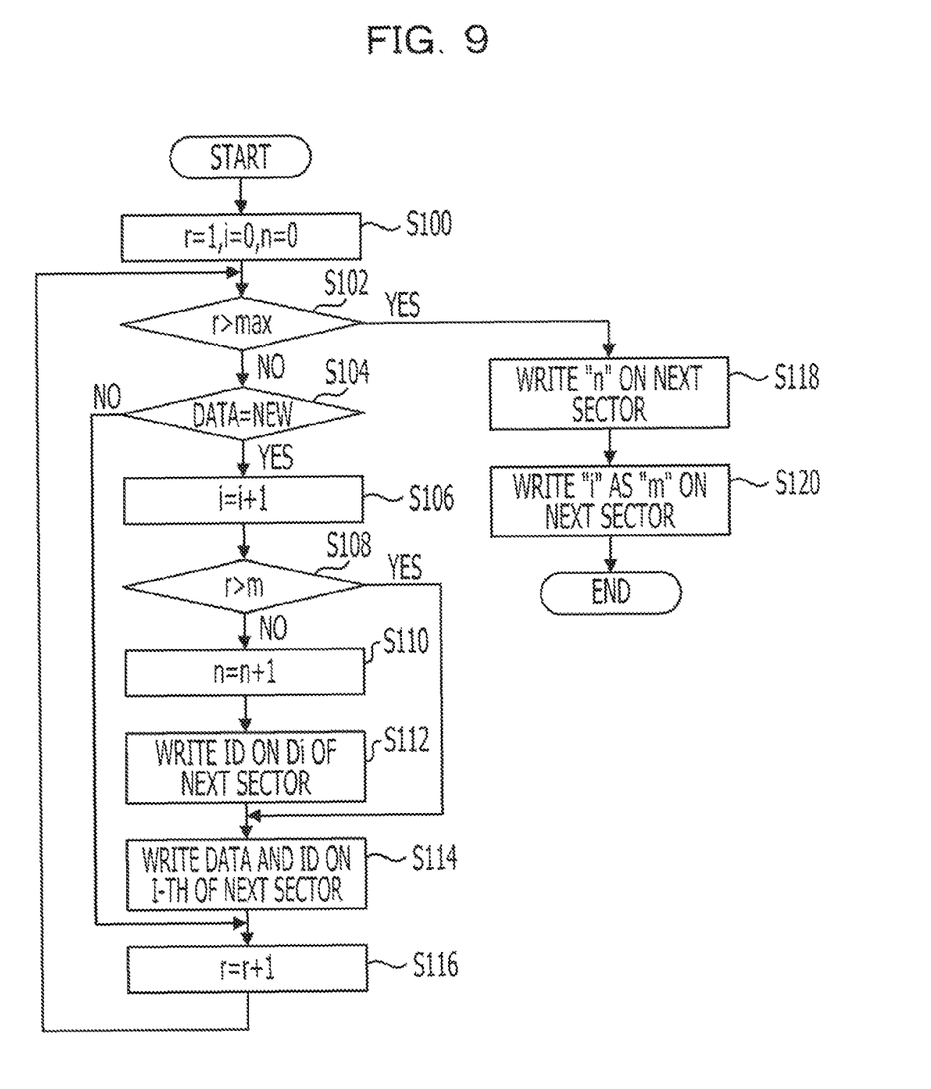
FIG. 9 illustrates an exemplary data transfer.

FIG. 9 illustrates an exemplary data transfer. For example, in FIG. 6 and FIG. 8, the data DATA is transferred to the next sector SEC. The data transfer illustrated in FIG. 9 may be executed by a program to be executed by the CPU or by the operation of the flash memory control circuit MCNT.

In an operation S100, the initial value of a counter value r representing an address is set to 1 and the initial values of an inner counter value i and the unupdated number n are cleared by "0". The counter value r may be, for example, a position of storage areas SAs arranged in ascending order from the top to the bottom as illustrated in FIG. 4.

In an operation S102, it is determined whether the counter value r exceeds the maximal value max. The maximal value max may indicate the largest address and may correspond to the storage area SA with the largest address in the sector SEC. If the counter value r exceeds the maximal value max, for example, all the storage areas SAs are searched, the process proceeds to an operation S118. If the counter value r is equal to or less than the maximal value max, for example, all the storage areas SAs are not searched, the process proceeds to an operation S104.

In the operation S104, it is determined whether the data DATA of the r-th storage area SA is updated. When the data DATA is "NEW", the process proceeds to an operation S106. When the data DATA is "OLD", the process proceeds to an operation S116.

In the operation S106, the inner counter value i is incremented by 1. In an operation S108, it is determined whether the counter value r exceeds the transfer number m. If the counter value r is equal to or less than the transfer number m, it is determined that the data DATA is not updated. Then, the process proceeds to an operation S110. If the counter value r exceeds the transfer number m, it is determined that the data DATA is updated at least once. Then, the process proceeds to the operation S114.

In an operation S110, the unupdate number n, which represents the number of unupdated data DATA to be stored in the additional area AA, is incremented by 1. In the operation S112, the number of the identifier ID is written as the i-th unupdate information Di in the additional area AA of the next sector SEC.

In the operation S114, the data DATA and the identifier ID are written in the i-th storage area SA of the next sector SEC. In the operation S116, the counter value r representing the address is incremented by 1. Then, the process proceeds to the operation S102.

In the operation S118, when all the storage areas SA are searched, the unupdate number n is written to the next sector SEC. In an operation S120, the counter value i representing the transfer number m of data DATA from the currently valid sector SEC to the next sector SEC to be valid, for example, the number of pieces of data indicating "NEW" is written to the next sector SEC. As illustrated in FIG. 6 and FIG. 8, the transfer of data to the next sector SEC is completed.

Figure 10:
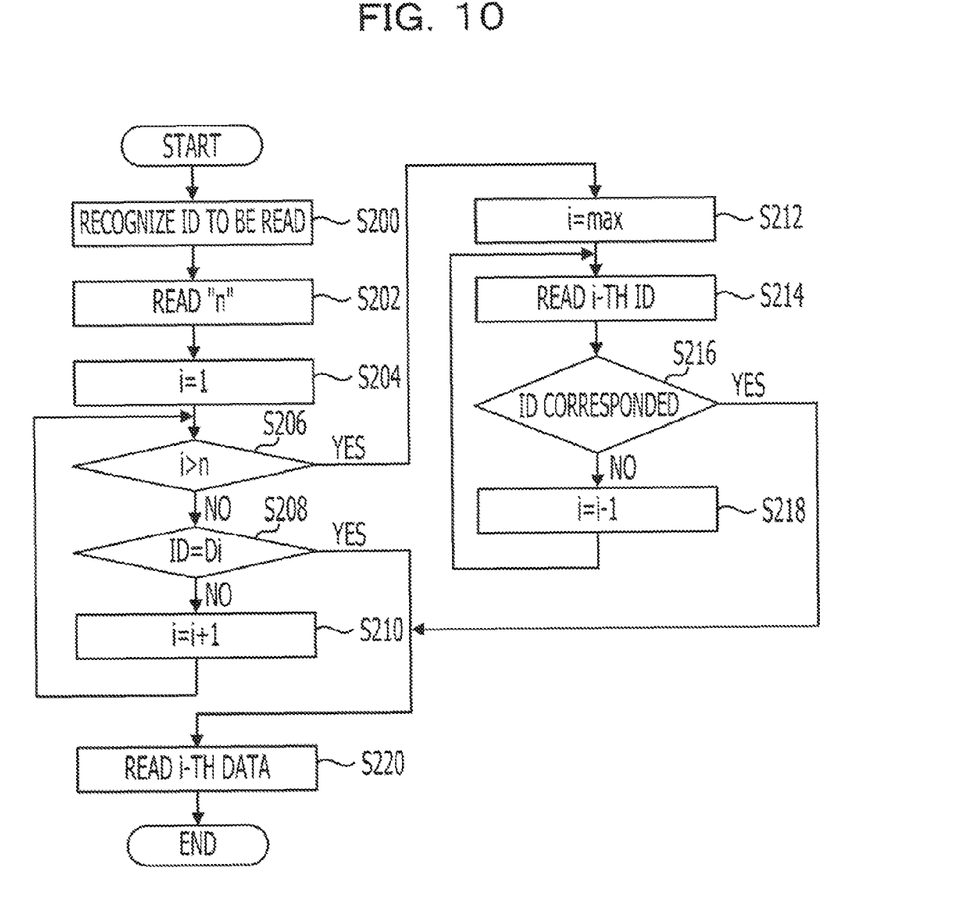
FIG. 10 illustrates an exemplary data search.

FIG. 10 illustrates an exemplary data search. In FIG. 7, for example, when data DATA is read from valid sector SEC, the data search is performed. The data search illustrated in FIG. 10 may be executed by a program to be executed by the CPU or by the operation of the flash memory control circuit MCNT.

In an operation S200, the identifier ID of data DATA to be read is recognized. In an operation S202, the unupdate number n is read from the sector SEC. In an operation S204, the inner counter value i is set to 1.

In an operation S206, it is determined whether the inner counter value i exceeds the unupdate number n. If the inner counter value "i" exceeds the unupdate number n, for example, if it is determined that the update frequency of the data DATA to be read is high, the process proceeds to an operation S212 to perform the backward search illustrated in FIG. 7. If the inner counter value i is equal to or less than the unupdate number n, the process proceeds to an operation S208.

In the operation S208, it is determined whether the identifier ID is stored as unupdate information Di in the additional area AA. If the identifier ID is stored as the i-th unupdate information Di, for example, if the update frequency of data DATA with the identifier ID is low, the process proceeds to an operation S220. If the identifier ID is not stored as the i-th unupdate information Di, the process proceeds to an operation S210. In the operation S210, the inner counter value i is incremented by 1, the process proceeds to the operation S206.

In the operation S212, the inner counter value i is set to the maximal value max to perform the backward search. The maximal value max indicates the largest address and corresponds to the storage area SA with the largest address in the sector SEC. The i-th identifier ID is read in the operation S214. In the operation S216, it is determined whether the identifier ID of data DATA to be read corresponds to the i-th identifier ID. If the identifier ID of data DATA to be read corresponds to the i-th identifier ID, the process proceeds to the operation S220. If the identifier ID of data DATA to be read is different from the i-th identifier ID, the process proceeds to the operation S218.

In the operation S218, the inner counter value i representing the address is decremented by 1 to perform the next backward search. Then, the process returns to an operation S214. In the operation S220, since the position of data DATA to be read in the sector SEC is revealed, the i-th data DATA is read. The read operation is completed.

For example, the number of identifiers IDs may be 50. The number of identifiers IDs with low update frequency, for example, the number of identifiers IDs to be stored in the additional area AA, may be 10. The number of pieces of data DATA to be searched stored in the sector SEC may be 100. The average number of search times when the data DATA with not-low update frequency, for example, the data DATA corresponding to the identifier ID, which is not stored in the additional area AA, is read may be 20.5 times. The data DATA with not-low update frequency may be stored in 40 storage areas SAs on the largest address side. At this time, the minimal number of search times of data DATA may be once, while the maximum number of search times may be 40. The average may be 20.5 times.

The minimal number of search times of data DATA with low update frequency may be once, while the maximum number of search times may be 10 times. The average may be 5.5 times. Therefore, if P (%) represents the probability where data DATA with low frequency, for example, data DATA corresponding to the identifier ID stored in the additional area AA, the average number of search times when data DATA is read is expressed by the following equation (1):

$$5.5 \times P/100 + 20.5 \times (100-P)/100 = 20.5 - (15 \times P)/100 \quad (1)$$

In the equation (1), for example, if P is equal to 10%, the average number of search times may be 19 times. If P is equal to 20%, the average number of search times may be 17.5 times.

On the other hand, when the data DATA with low update frequency is searched by the backward search, the minimal number of search times may be 91 times and the maximal number of search times may be 100 times. The backward search may be conventional. The average may be 95.5 times. Therefore, the average number of search times when the data DATA is read by the backward search is expressed by the following equation (2):

$$95.5 \times P/100 + 20.5 \times (100-P)/100 = 20.5 + (75 \times P)/100 \quad (2)$$

In the equation (2), for example, if P is equal to 10%, the average number of search times may be 28 times. If P is equal to 20%, the average number of search times may be 35.5 times. Comparing with the case where only the backward search is performed, the average number of search times is decreased by about 32% (P=10%) or about 51% (P=20%).

Since a valid flag, an erasing-desired flag, or an erasing-completed flag is set in the header HEAD, any valid sector SEC where valid data DATA is stored may be easily detected.

When data DATA is transferred from the valid selector SEC to the next sector SEC, the data DATA representing "NEW" are sequentially copied in the next sector SEC. When data DATA is copied in the next sector SEC, the identifiers IDs may be arranged in order and the data DATA with the identifiers IDs, which are arranged in ascending order or in descending order, may be written to the next sector. When the data DATA to be read is searched, a binary research where search is performed while the search area is divided into two in a stepwise manner may be performed. The number of search times of data DATA to be read may be decreased. For example, under the conditions described above, the average number of search times of data DATA with low update frequency may be 3.6 times. When this is applied to equation (1), the average number of search times may be 17.1 times if P is equal to 20%.

The data DATA stored in the flash memory FLASH may be processed. The data stored in a non-volatile semiconductor memory, where a write operation is performed for every storage area with a certain size and an erase operation is collectively performed in a plurality of storage areas, may be processed.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

What is claimed is:

1. A data-processing method in a memory having at least a first sector comprising a plurality of storage areas and a second sector comprising a plurality of storage areas, each storage area including data and an identifier associated with the data, the method comprising:

copying first data from a first storage area of the plurality of storage areas in the first sector to a second storage area within a leading portion of the plurality of storage areas in the second sector, wherein the first data has not been updated within the first sector; and adding a first identifier of the first data to an area of the second sector by a memory control circuit when copying the first data in the first storage area to the second storage area;

comparing the first identifier in the area of the second sector with a second identifier of data to be read from the memory;

searching one or more identifiers in the second sector for the second identifier starting at an end of the second sector when the second identifier does not match the first identifier; and after finding an identifier of the one or more identifiers in the second sector that matches the second identifier, reading the data associated with the found identifier from the second sector.

2. The data-processing method according to claim 1, further comprising:

copying second data from another storage area in the first sector to another storage area in the second sector that follows the second storage area, wherein the second data has been updated.

3. The data-processing method according to claim 1, further comprising:

adding a number of the first data to the second sector.

4. The data-processing method according to claim 1, further comprising:

searching one or more identifiers in the second sector for the second identifier starting at the leading portion of the second sector when the second identifier matches the first identifier.

5. The data-processing method according to claim 1, further comprising:

setting an erasing flag to the first sector; and setting a flag indicating in-use to the second sector.

6. The data-processing method according to claim 1, further comprising:

invalidating the first identifier when the first data is updated.

7. A data-processing method in a memory, the method comprising:

receiving a first identifier of data to be read from the memory having a first sector and a second sector;

comparing the first identifier with a second identifier of first data which has not been updated in the first sector, the first data being stored in the second sector, and the second identifier being stored in an area of the second sector;

searching one or more identifiers in the second sector for the first identifier starting at a leading portion of the second sector when the second identifier matches the first identifier;

searching one or more identifiers in the second sector for the first identifier starting at an end of the second sector when the second identifier does not match the first identifier; and after finding an identifier of the one or more identifiers in the second sector that matches the first identifier, reading the data associated with the found identifier from the second sector.

8. The method according to claim 7, further comprising:

storing the first data in the second sector at the leading portion of the second sector when transferring data in the first sector to the second sector.

9. The method according to claim 8, further comprising:

storing second data which has been updated in the first sector in an area of the second sector that follows an area in which the first data is stored.

10. The method according to claim 7, further comprising:

invalidating the second identifier when the first data is updated in the second sector.

11. A system, comprising:

a CPU;

a memory including at least a first sector and a second sector; and a memory control circuit controlled by the CPU and configured to:

receive a read instruction from the CPU to read data associated with a first identifier from the memory;

compare a second identifier of first data with the first identifier of data to be read from the memory, wherein the second identifier is stored in an area of the second sector, and wherein the first data has not been updated in the first sector, search one or more identifiers in the second sector for the first identifier starting at a leading portion of the second sector when the second identifier matches the first identifier, search one or more identifiers in the second sector for the first identifier starting at an end of the second sector when the second identifier does not match the first identifier, and after finding an identifier of the one or more identifiers in the second sector that matches the first identifier, read the data associated with the found identifier from the second sector.

12. The system according to claim 11, wherein the memory control circuit stores first data at a leading portion of the second sector when transferring the data of the first sector to the second sector.

13. The system according to claim 12, wherein the memory control circuit is further configured to store second data which has been updated in the first sector in an area of the second sector that follows an area in which the first data is stored.

14. The system according to claim 11, wherein the first sector is in a state of being erased based on an erase instruction from the CPU.

15. The system according to claim 11, wherein the memory control circuit is configured to invalidate the second identifier when the first data is updated in the second sector.

* * * * *